United States Patent [19]

Hannibal

[11] 4,252,506
[45] Feb. 24, 1981

[54] VARIABLE CAPACITY COMPRESSOR

[75] Inventor: Billy B. Hannibal, Tecumseh, Mich.

[73] Assignee: Tecumseh Products Company, Tecumseh, Mich.

[21] Appl. No.: 938,940

[22] Filed: Sep. 1, 1978

[51] Int. Cl.³ .................. F04B 35/04; H02K 16/02
[52] U.S. Cl. ........................... 417/419; 417/426; 310/114
[58] Field of Search ............... 62/510; 417/419, 426, 417/427; 310/114

[56] References Cited

U.S. PATENT DOCUMENTS

| | | | |
|---|---|---|---|
| 388,093 | 8/1888 | Waddell | 307/16 |
| 3,253,776 | 5/1966 | Parker | 417/419 X |
| 3,509,907 | 5/1970 | Garraway | 417/419 X |
| 3,651,355 | 3/1972 | Mason | 310/114 X |
| 3,785,169 | 1/1974 | Gyllard | 62/510 X |
| 4,105,374 | 8/1978 | Scharf | 417/426 X |

FOREIGN PATENT DOCUMENTS 2740117  3/1978  Fed. Rep. of Germany ........... 310/114

*Primary Examiner*—Richard E. Gluck
*Attorney, Agent, or Firm*—Albert L. Jeffers; John F. Hoffman

[57] ABSTRACT

A variable capacity compressor for refrigeration systems such as air conditioners and heat pumps comprising an outer casing having a lubricant sump in the lower portion thereof, a crankcase internally spring mounted within the outer casing and having a pair of parallel, vertical crankshafts rotatably supported therein, wherein the crankshafts are arranged in side-by-side relationship, and at least two expansible chamber pumps, which may be piston, rotary or screw type, driven by the crankshafts. A pair of independently controlled electric motors have their rotors drivingly connected to the crankshafts, and in one embodiment of the invention, the motors have a common stator with two independently controlled sets of windings. In a further embodiment of the invention, two crankcases are provided, sharing a common lubricant sump.

10 Claims, 10 Drawing Figures

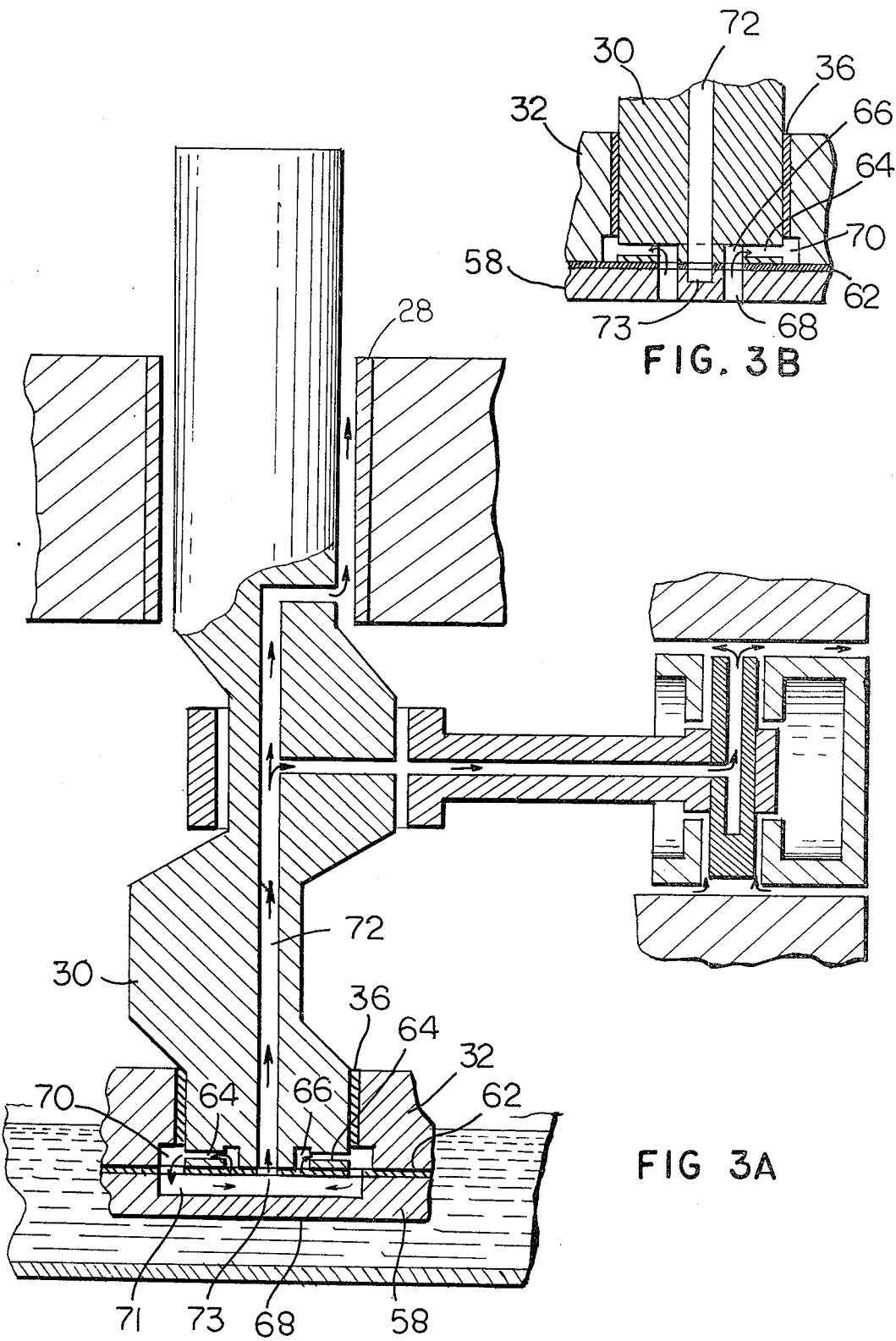

VARIABLE CAPACITY COMPRESSOR

BACKGROUND OF THE INVENTION

The present invention relates to a compressor for use in refrigeration systems such as air-conditioners and heat pumps, and in particular to a variable capacity compressor which has dual motor-crankshaft-pump units mounted within a common housing and having a common inlet and outlet.

In certain refrigeration systems, such as air-conditioners and heat pumps for commercial and residential dwellings, it is desirable to vary the capacity of the refrigerant compressor in order to more closely match the heating or cooling requirements. Although it is possible to utilize a compressor which is large enough to handle even the highest demand, such a compressor runs less efficiently during periods of low demand, thereby increasing energy costs.

One technique for providing variable capacity in a compressor, is to drive the compressor by means of a two speed motor. Such a motor involves relatively costly switching apparatus, and often runs at lower efficiency than a single speed motor.

U.S. Pat. No. 2,012,704 discloses a motor-compressor unit for refrigeration apparatus wherein a plurality of motor-compressors are housed within a single shell, and wherein the units are coaxially mounted. The motor-compressor units have separate crankcases which are physically separated thereby unduly increasing the size of the unit. Furthermore, due to the fact that the crankshafts are horizontal and in line, lubrication of the system is much more complicated. It is the purpose of this system to combine a plurality of identical and complete motor-compressor units into one complete unit of greater capacity than either of the units by itself, rather than to provide a compressor of variable capacity as in the present invention.

SUMMARY OF THE INVENTION

The present invention overcomes the disadvantages and problems of the prior art by providing a compressor having variable capacity by virtue of a pair of motor-compressor units disposed in side-by-side relationship in a common housing and arranged vertically so as to facilitate lubrication of the system. In one embodiment of the invention, the motor-compressor units have a common crankcase in which a pair of parallel, vertical crankshafts are rotatably received and have respective pistons reciprocably received in the crankcase. The crankshafts are driven by a pair of motors, having field windings on a common stator or on separate stators which are in close proximity to each other. The motor-compressor units share a common lubricant sump and pump the lubricant to the various lubricated points of the system by means of the respective crankshaft pumps.

Specifically, the present invention contemplates a refrigeration compressor comprising an outer casing having a lubricant sump in the lower portion thereof, and a pair of crankcases supported within the outer casing and having a pair of crankshafts rotatably supported therein, said crankshafts being generally vertical and parallel and disposed in side-by-side relationship. A pair of fluid pump means are driven respectively by the crankshafts and each have a fluid inlet and a fluid outlet. A pair of independently controlled electric motors drive the crankshafts, and a pump is provided for pumping lubricant from the sump to lubricate the crankshafts and the pumps.

According to another embodiment of the invention, the compressor comprises an outer casing having a lubricant sump in the lower portion thereof, a single integral crankcase supported within the outer casing and having a pair of crankshafts rotatably supported therein, said crankshafts being generally parallel to each other and disposed in side-by-side relationship. A pair of fluid pump devices are driven respectively by the crankshafts and each includes a fluid inlet and a fluid outlet. A pair of independently controlled electric motors drive the crankshaft, and pumps are provided for pumping lubricant from the sump to lubricate the crankshafts and fluid pumps.

According to a third embodiment of the invention, the compressor comprises an outer casing having a lubricant sump in the lower portion thereof, crankcase means supported within the outer casing and having a pair of crankshafts rotatably supported therein, said crankshafts being generally parallel to each other. A pair of fluid pumps are driven respectively by the crankshafts and each includes a fluid inlet and a fluid outlet. The crankshafts and fluid pumps share the lubricant sump, and means are provided for pumping lubricant from the sump to lubricate the crankshafts and pumps. A pair of independently controlled electric motors rotatably drive the crankshafts, said electric motors having a common stator with at least two independently controlled sets of windings.

It is an object of the present invention to provide a variable capacity refrigeration compressor having at least two motor-compressor units contained within a single housing having a common lubricant sump, and wherein the motor-compressor units are arranged in side-by-side relationship and are oriented vertically, thereby providing a very compact unit and enchancing lubrication of the system.

It is a further object of the present invention to provide a variable capacity compressor having two compressor pump units driven by electric motors positioned in side-by-side relationship and having a common stator so as to utilize a less costly switching mechanism than is normally used in a compressor driven by a two-speed motor.

A still further object of the present invention is to provide a variable capacity compressor which allows increased flexibility in the compressor displacement, porting and re-expansion design.

Another object of the present invention is to provide a compressor, the capacity of which is variable by virtue of a pair of pumps driven by independently controlled electric motors.

These and other objects and features of the present invention will be more apparent from the detailed description, taken together with the accompanying drawings.

BRIEF DESCRIPTION OF THE DRAWINGS

FIGS. 3A and 3B are sectional views taken along lines 3A—3A and 3B—3B of FIG. 1 showing the oil pump in greater detail;

DETAILED DESCRIPTION

Figure 1:
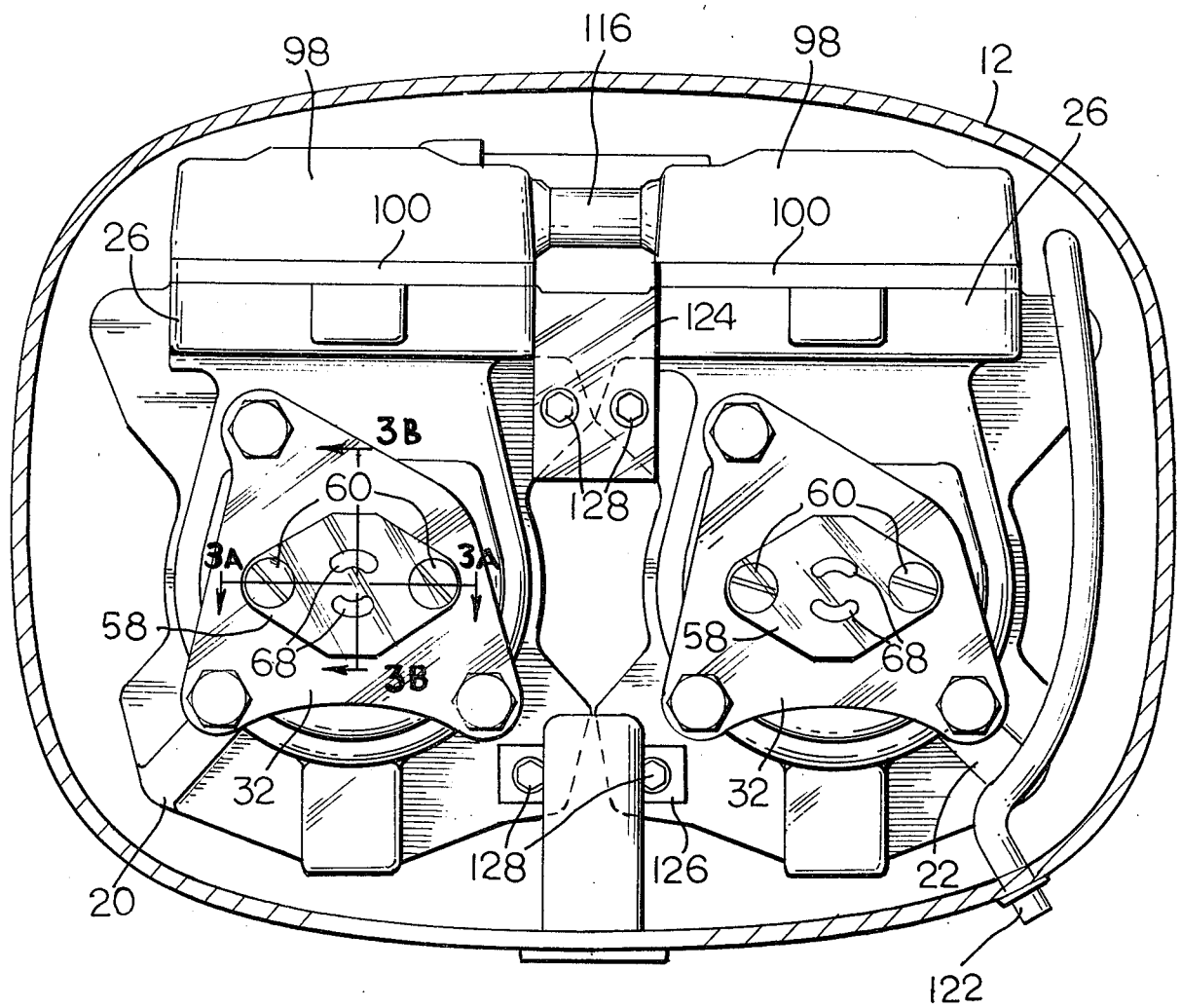
FIG. 1 is a partially sectioned bottom view of a double crankcase compressor according to the present invention.

Referring now to FIGS. 1-4, a compressor according to the present invention and having two separate crankcases in side-by-side relationship will be described. The compressor 10 comprises an outer housing 12 hermetically encasing the fluid pump 14 and motor 16. The pump and motor unit is resiliently suspended within housing 12 by means of spring assemblies 18, which connect between outer housing 12 and each of the crankcases 20 and 22 at a plurality of points about its periphery.

Figure 3:
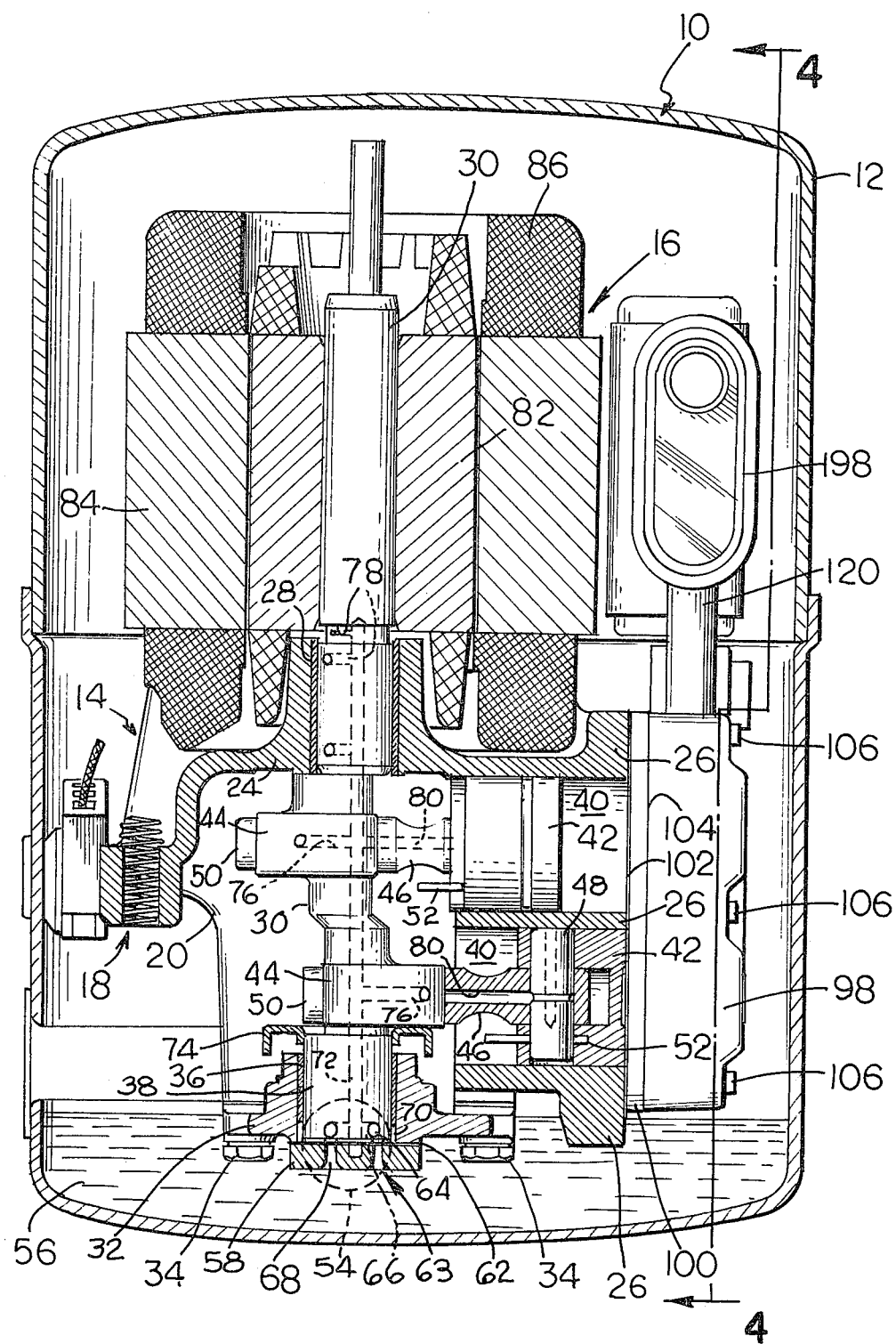
FIG. 3 is a sectional view taken along line 3—3 of FIG. 2 and viewed in the direction of the arrows.

Two such crankcases 20 and 22 are provided and each comprises a crankshaft support portion 24 and block 26. Rotatably received within crankcase bushing 28, which is fixedly received within an opening in the respective crankcase 20 and 22, is a crankshaft 30. It should be noted that each of the elements shown in FIG. 3 is common to each of the motor-compressor units of which crankcases 20 and 22, respectively, form a portion. Therefore, where possible, like reference numerals will be utilized for identical parts.

An outboard bearing 32 is secured to crankcase 20 by means of bolts 34, and includes bushing 36 in which the lower end 38 of crankshaft 30 is rotatably received.

Received in cylinders 40 are pistons 42, which are connected to the crankpins 44 of crankshaft 30 by means of connecting rods 46. Each connecting rod 46 is pivotally connected adjacent one end to its piston 42 by wrist pin 48 and to crankpin 44 adjacent its other end by means of connecting rod bore 50. Pistons 42 are provided with roll pins 52.

In order to provide lubrication to crankshaft 30 and pistons 42, the compressor is provided with an oil pump 54, which is submerged within a reservoir of oil 56 in the lower portion of outer housing 12. Oil pump 54 comprises thrust plate 58, which is secured to outboard bearing 32 by means of screws 60, thrust bearing plate 62 positioned between thrust plate 58 and bearing 32, and a pump impeller 63 comprising a plurality of openings 64 extending radially inwardly from the exterior of the lower portion 38 of crankshaft 30 to an annular chamber 66 extending through the lower end of crankshaft 30. As crankshaft 30 rotates, pump impeller 63 also rotates so as to create suction which draws lubricating oil 56 from the bottom of thrust plate 58 upwardly through ports 68 into annular chambers 66, thereby causing the oil therein to be centrifuged radially outwardly via passages 64 into radial chamber 70 at a higher pressure. The pressure in chamber 70 forces the oil downwardly and through passageways 71 to point 73 where it flows upwardly through the central lubricating passageway 72 and crankshaft 30. Oil spinner 74 is fixedly secured to the lower portion 38 of crankshaft 30.

The oil in passageway 72 splits and a portion thereof flows through passageways 76 to crankpins 44 and the remainder flows further upwardly and out through passageways 78 to lubricate crankshaft 30. From crankpins 44, the oil flows through passageways 80 in connecting arms 46 through both centrifugal action in the throw portions of crankshafts 30 and the inertia of the oil moving toward pistons 42 on the upstroke and continuing in that direction on the downstroke. The oil then moves through wrist pins 48 to lubricate the cylinder walls and the wrist pin to piston bearing surfaces. The excess oil spills over the returns to sump 56. Thus, it can be seen, that by orienting the compressor with the crankshafts 30 arranged vertically and parallel to each other, very efficient lubrication of the moving parts of the compressor 10 is accomplished. This is not the case in compressors which are arranged horizontally with the crankshafts coaxial to each other.

Crankshaft 30 is driven by motor 16, the rotor 82 of which is shrunk on crankshaft 30 without the addition of quills or bushings, as in the case of many prior art compressors. Stator 84 has windings 86 inserted in slots 135 therein, each set of windings 86 being independently controlled so that only one of motors 16 may be run at one time or, alternatively, both motors 16 can be run simultaneously. This enables the capacity of compressor 10 to be increased when demand is high. Obviously, three or more motor-compressor units could be provided in a single housing, such as housing 12, or the displacement of one side could vary from the other if a wider range of compressor capacity is desired. Motors 16 are provided with overload protection devices 88.

Figure 2:
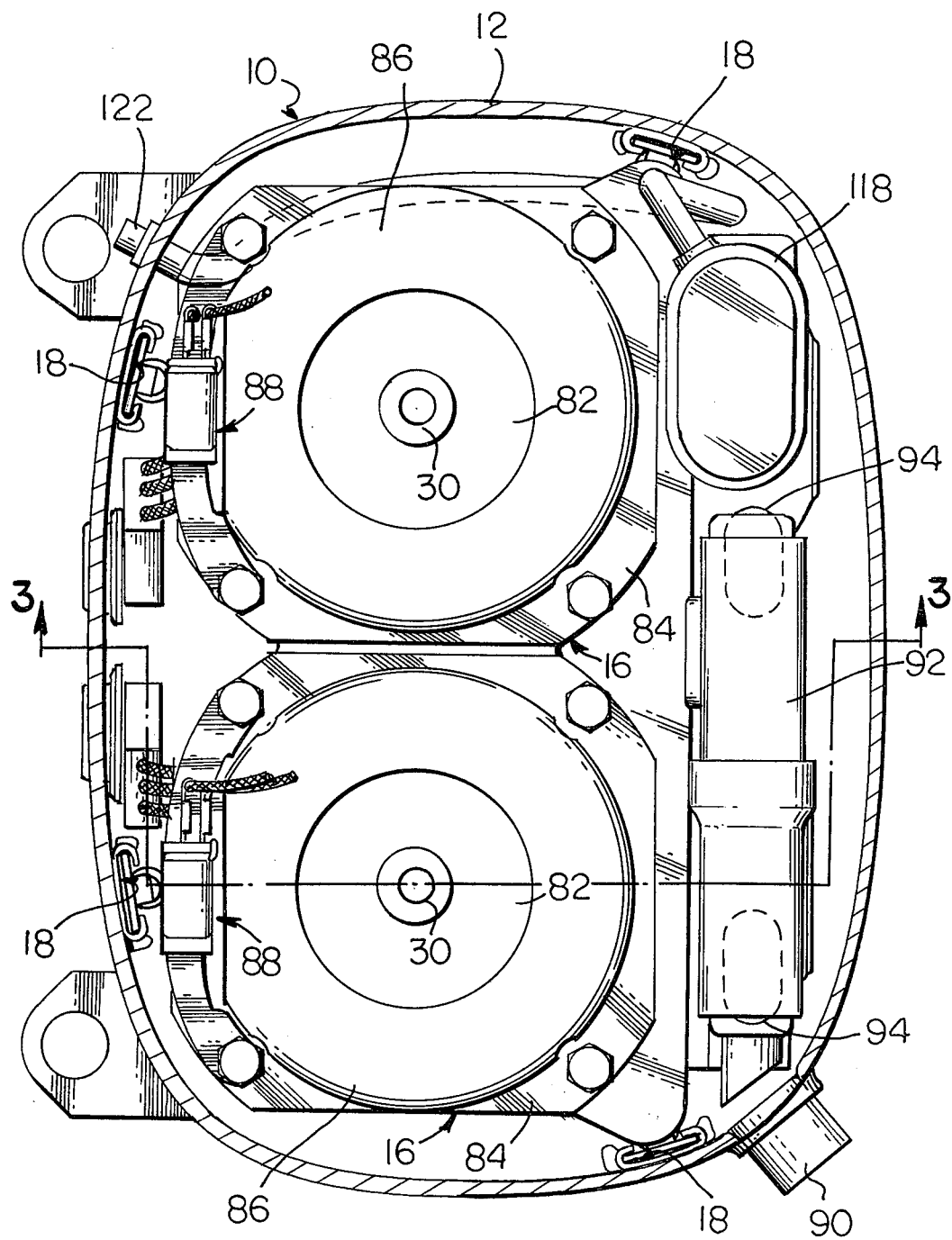
FIG. 2 is a partially sectioned top view thereof.
Figure 4:
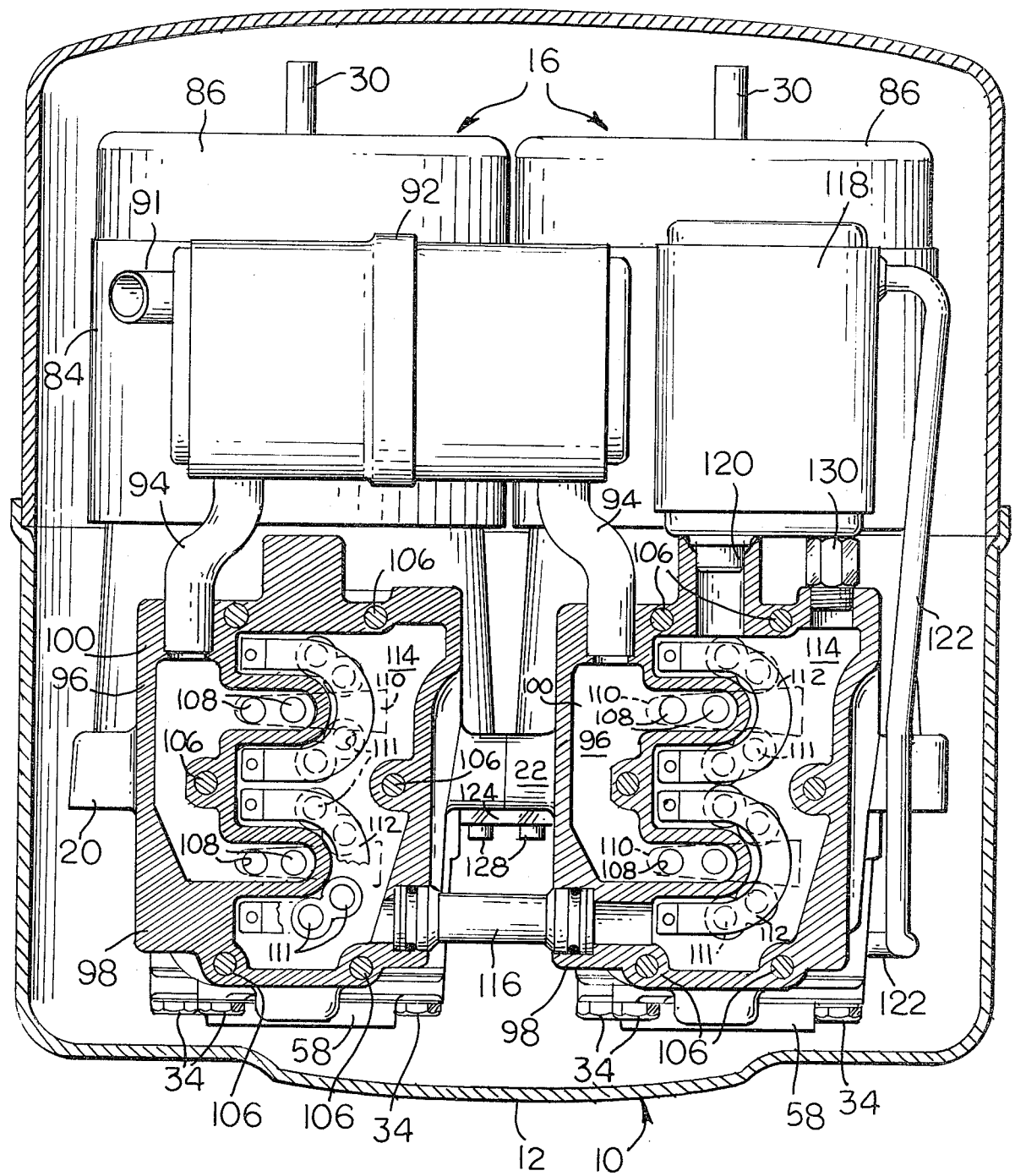
FIG. 4 is a sectional view taken along line 4—4 of FIG. 3 and viewed in the direction of the arrows.

With particular reference now to FIGS. 2, 3 and 4, the refrigerant system will be described. Gaseous refrigerant from the suction accumulator (not shown) flows into compressor 10 through suction inlet 90 to inlet 91 into suction muffler 92 and from there through tubes 94 into inlet chambers 96 enclosed by cylinder head 98 and valve plate 100. Gaskets 102 and 104 seal valve plates 100 with respect to cylinder heads 98 and blocks 26. Cylinder heads 98 are secured through plates 100 to blocks 26 by means of screws 106.

On the respective downstrokes of pistons 42, refrigerant is drawn through ports 108 past leaf valves 110 into cylinders 40. On the respective upstrokes of pistons 42, the pressurized refrigerant flows through ports 111 past leaf valves 112, which are forced open, into outlet chamber 114. The pressurized refrigerant from one of the outlet chambers 114 flows through discharge connector tube 116 into the other outlet chamber 114 and the combined refrigerant flows into discharge muffler 118 through outlet port 120. From discharge muffler 118, the pressurized refrigerant flows through outlet tube 122 to the system condenser (not shown).

Although the present compressor is shown as being connected in parallel, it could also be connected to series by feeding the high pressure refrigerant from the outlet chamber 114 of one motor-compressor unit to the inlet chamber 96 of the other unit. Furthermore, interstage cooling could be provided.

Crankcases 20 and 22 are connected together by means of plates 124 and 126 and screws 128. A pressure relief valve 130 is provided for outlet chamber 114.

Figure 5:
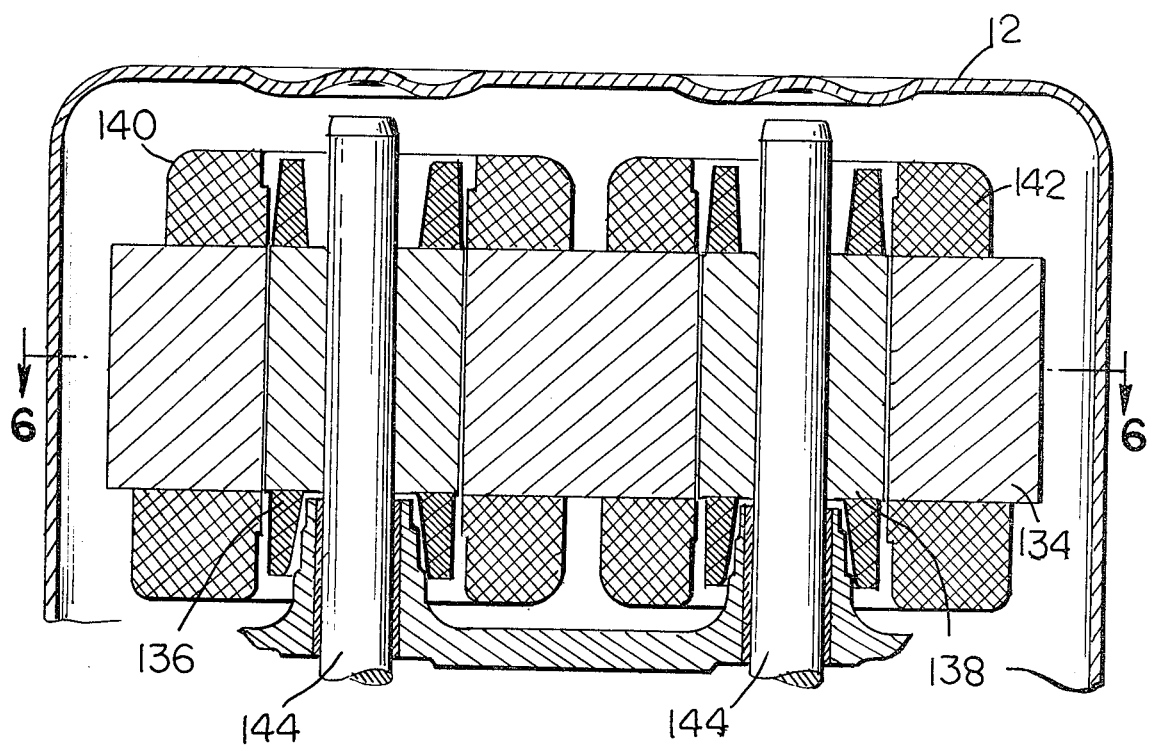
FIG. 5 is a fragmentary partially sectioned top view of a single stator embodiment of the present invention.
Figure 6:
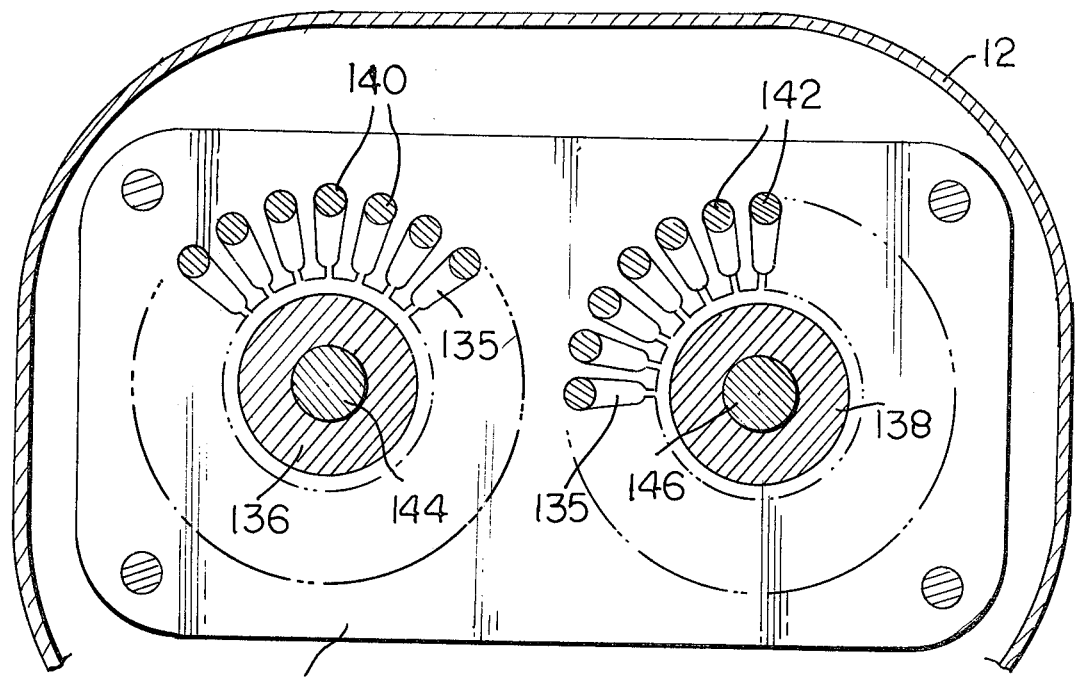
FIG. 6 is a fragmentary sectional view taken along line 6—6 of FIG. 5 and viewed in the direction of the arrows.

Rather than motors 16 having two separate stators 84, the motor 16 may be combined into a single unit 134 as shown in FIGS. 5 and 6. In this embodiment, a single stator 134 having integral laminations for each of rotors 136 and 138 is provided. Stator 134 has separate field windings 140 and 142, which are independently controlled so that either or both rotors 136 and 138 may be driven. As in the case of the previous embodiment, rotors 136 and 138 are shrunk on crankshafts 144 and 146, respectively.

The motors, such as motors 16 and the single stator motor shown in FIGS. 5 and 6, are preferably induction motors having a stator with distributed windings and a squirrel cage.

An alternative modification to the single stator motor of FIGS. 5 and 6 would be to provide two separate stators, which are positioned in side-by-side abuttment relative to each other.

Figure 7:
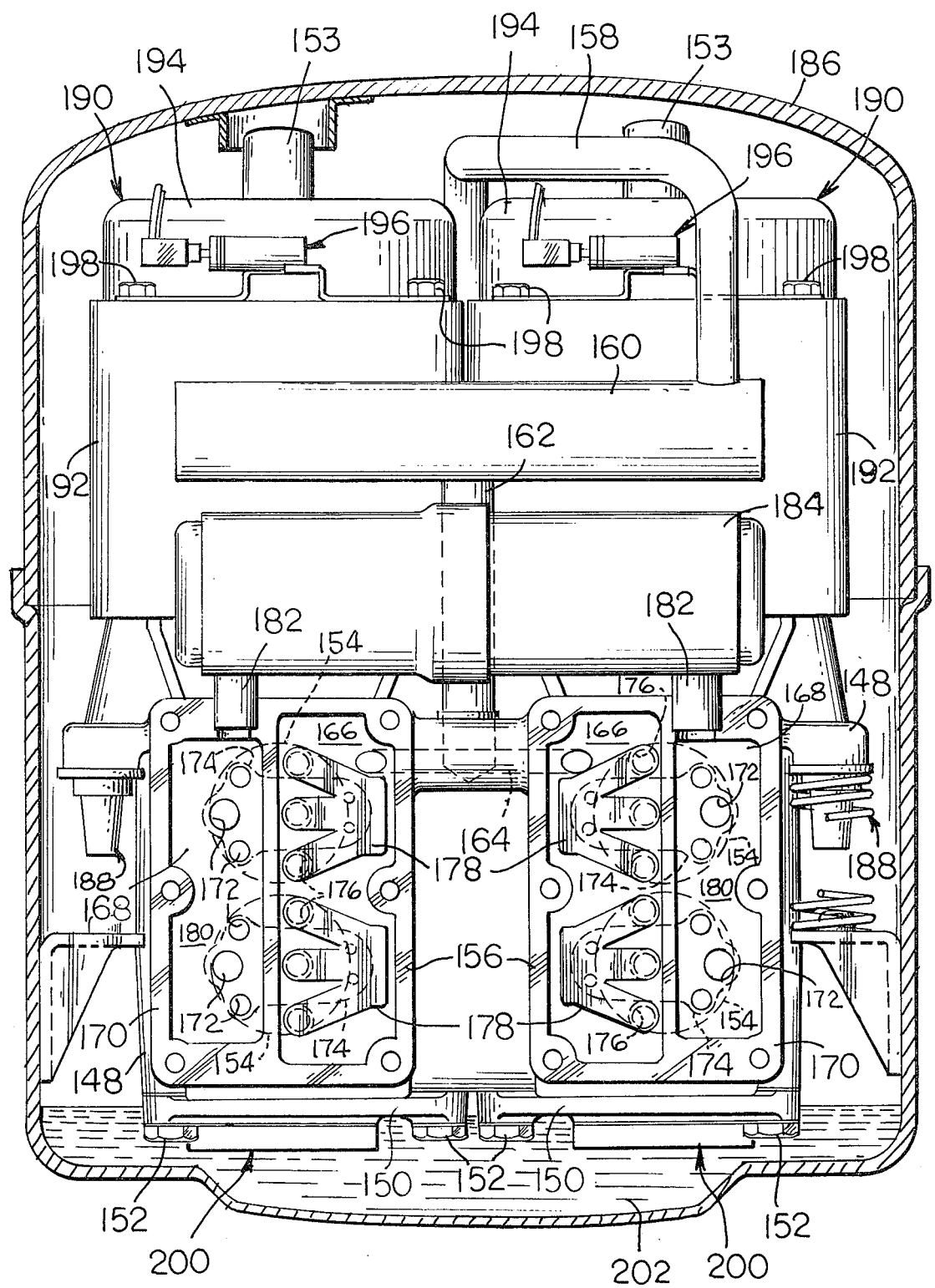
FIG. 7 is a partially sectioned front elevational view of a single crankcase embodiment of the present invention.
Figure 8:
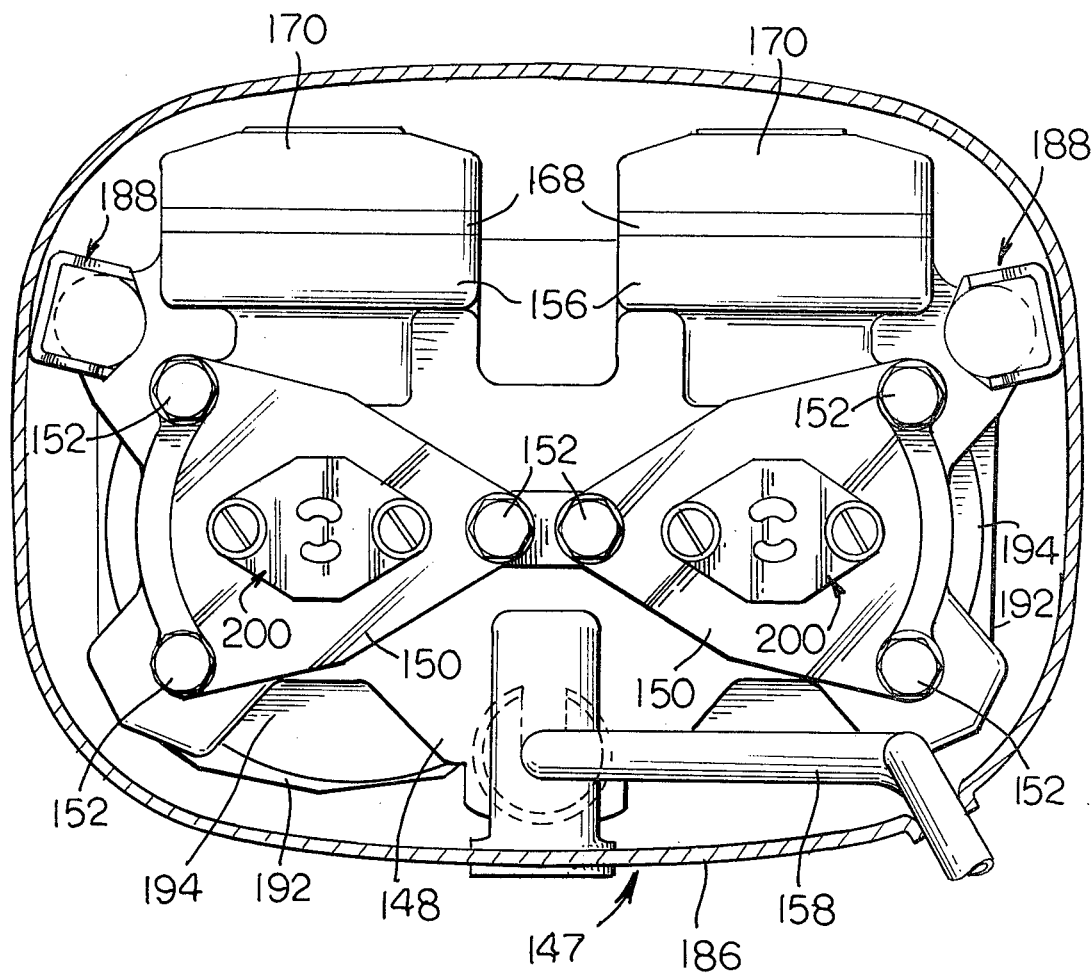
FIG. 8 is a partially sectioned bottom view of the compressor of FIG. 7.

Referring now to FIGS. 7 and 8, a further embodiment of the present invention will be described. In this embodiment, compressor 147 comprises a single integral crankcase 148 rather than separate crankcases as in the embodiment of FIGS 1-4. In nearly every other respect, compressor 147 is identical to compressor 10, and may include a single stator motor unit as shown in FIGS. 5 and 6.

Crankcase 148 includes a pair of outboard bearings 150 which are secured thereto by bolts 152 and in which the lower end of the crankshafts 153 are rotatably received. Pistons 154 are reciprocably received in block 156, which is the forwardmost portion of crankcase 148 and draw gaseous refrigerant in through an intake tube (not shown), intake muffler 184, tube 182 to intake chambers 180, which are formed between valve plates 168 and heads 170. From inlet chambers 180, the refrigerant is drawn into the cylinders through ports 172 past leaf valves 174, which are secured at one end to valve plates 168. On the piston upstroke, the refrigerant is forced through ports 176, past leaf valves 178 into outlet chambers 166. The pressurized refrigerant flows from outlet chambers 166 through passage 164 and tube 162, into exhaust muffler 160 and from there to the outlet tube 158 leading to the refrigeration system condenser (not shown).

The motor compressor unit is resiliently supported within outer housing 186 by means of a plurality of spring assemblies 188, which serve to protect the compressor against shocks and isolate the noise and vibration so that it does not reach outer housing 186.

Motors 190 comprise stators 192 having field windings 194 inserted therein and respective rotors (not shown) shrunk on crankshafts 153. Overload protection devices 196 may also be provided. As in the case of the previous embodiments, stators 192 are secured to crankcase 148 by means of bolts 198.

Oil pump 200, which is identical to that described previously, draws oil from sump 202 and lubricates the bearing surfaces of the compressor. If desired, motors 190 could be of the single stator type shown in FIGS. 5 and 6.

While this invention has been described in terms of a preferred embodiment, it should be understood that it is capable of further modification. This application is, therefore, intended to cover any variations, uses, or adaptations of the invention following the general principles thereof and including such departures from the present disclosure as come within known or customary practice in the art to which this invention pertains and fall within the limits of the appended claims.

What is claimed is:

1. A refrigeration compressor comprising:
   an outer housing having a lubricant sump in the lower portion thereof,
   a pair of crankcases resiliently supported within said outer housing for limited movement relative thereto so as to at least partially isolate vibration and movement of said crankcases from said outer housing,
   a pair of crankshafts rotatably supported respectively in said crankcases, said crankshafts being generally vertical and parallel and disposed in side-by-side relationship,
   at least two fluid pump means driven respectively by said crankshafts,
   fluid inlet and outlet means for providing refrigerant flow to and from said fluid pump means,
   said fluid inlet and outlet means including at least one of a refrigerant suction conduit and a refrigerant discharge conduit within said housing connected commonly to said crankcases,
   said crankcases being rigidly connected together such that they move as a unit within said outer housing,
   a pair of independently controlled electric motor means respectively for rotatably driving said crankshafts, and
   means for pumping lubricant from said sump to lubricate said compressor.

2. The compressor of claim 1 wherein said fluid pump means comprise expansible chamber pumps.

3. The compressor of claim 2 wherein said expansible chamber pumps are piston-type pumps.

4. The compressor of claim 1 wherein said means for pumping lubricant comprises a pair of oil pumps at least partially submerged in said sump and a lubricant passageway in each of said crankshafts supplied with lubricant by said oil pumps.

5. The compressor of claim 1 wherein said motor means are mounted within said outer housing in close side-by-side parallel relationship and have separate field windings which are independently controlled.

6. The compressor of claim 5 wherein said motor means together comprise a single stator common to each of them.

7. The compressor of claim 1 wherein each of said crankcases includes a discharge head connected by a rigid conduit means to a muffler common to said heads, said muffler, conduit means and crankcases forming a rigid assembly moving as a unit in said outer housing.

8. The compressor of claim 1 wherein said crankcases are integrally connected together.

9. A refrigeration compressor comprising:
   an outer housing having a lubricant sump in the lower portion thereof,
   a pair of crankcases resiliently supported within said housing for limited movement relative thereto so as to at least partially isolate vibration and movement of said crankcases from said outer casing,
   a pair of crankshafts rotatably supported respectively in said crankcases, said crankshafts being generally vertical and parallel and disposed in side-by-side relationship,
   at least two fluid pump means driven respectively by said crankshafts,
   fluid inlet and outlet means for providing refrigerant flow to and from said fluid pump means,
   said crankcases being rigidly connected together such that they move as a unit within said outer housing,
   one of a suction muffler and a discharge muffler commonly connected to both said crankcases by conduit means, said one muffler and said conduit means and said crankcases forming a rigid assembly moving as a unit with said outer housing, a pair of independently controlled electric motor means respectively for rotatably driving said crankshafts, and means for pumping lubricant from said sump to lubricate said compressor.

10. The compressor of claim 9 further including the other of a suction muffler and a discharge muffler commonly connected to said crankcases by a second conduit means, said other muffler, said second conduit means and said crankcases moving as a unit in said outer housing.

* * * * *